United States Patent
Puiu et al.

(10) Patent No.: US 7,503,866 B2
(45) Date of Patent: *Mar. 17, 2009

(54) AXLE ASSEMBLY WITH TORQUE VECTORING DRIVE MECHANISM

(75) Inventors: Dumitru Puiu, Sterling Heights, MI (US); Malcolm E. Kirkwood, Livonia, MI (US)

(73) Assignee: Magna Powertrain USA, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/043,160

(22) Filed: Mar. 6, 2008

(65) Prior Publication Data

US 2008/0153649 A1 Jun. 26, 2008

Related U.S. Application Data

(63) Continuation of application No. 11/301,083, filed on Dec. 12, 2005, now Pat. No. 7,361,113.

(60) Provisional application No. 60/644,750, filed on Jan. 18, 2005.

(51) Int. Cl.
*F16H 48/06* (2006.01)
*F16H 37/08* (2006.01)
*F16H 3/44* (2006.01)
*F16D 47/00* (2006.01)

(52) U.S. Cl. .................. 475/221; 475/205; 475/312; 192/48.3

(58) Field of Classification Search ............ 475/200, 475/203, 204, 205, 221, 223, 249, 311, 312, 475/314; 192/48.3, 48.6, 48.92; 180/372
See application file for complete search history.

(56) References Cited

U.S. PATENT DOCUMENTS

| 856,703 A | 6/1907 | Iversen |
|---|---|---|
| 1,382,289 A | 6/1921 | Janicki |
| 1,954,686 A | 4/1934 | Stickney |
| 1,964,956 A | 7/1934 | Lincoln |
| 2,466,683 A | 4/1949 | Buckendale |
| 2,946,239 A | 7/1960 | Hait |
| 3,448,696 A | 6/1969 | Roper |

(Continued)

FOREIGN PATENT DOCUMENTS

WO WO 02/09966 A1 2/2002

*Primary Examiner*—Roger Pang
(74) *Attorney, Agent, or Firm*—Harness, Dickey & Pierce, P.L.C.

(57) ABSTRACT

A drive axle assembly includes a pair of axelshafts connected to a pair of wheels and a drive mechanism for selectively coupling a driven input shaft to one or both of the axelshafts. The drive mechanism includes first and second drive units that can be selectively engaged to control the magnitude of the drive torque transferred and the relative rotary speed between the input shaft and the axleshafts. Each drive unit includes a planetary gearset disposed between the input shaft and its corresponding axleshaft, a bi-directional overrunning clutch and a mode clutch that may be activated to cause the planetary gearset to establish different speed ratio drive connections between the input shaft and the axleshaft. A control system including an electronic control unit (ECU) and sensors are provided to control actuation of the mode clutches so as to control the side-to-side traction characteristics of the drive axle assembly.

22 Claims, 8 Drawing Sheets

U.S. PATENT DOCUMENTS

| | | | |
|---|---|---|---|
| 3,690,426 A | 9/1972 | Weisgerber | |
| 4,280,375 A | 7/1981 | Goscenski, Jr. | |
| 4,691,593 A | 9/1987 | Mueller | |
| 4,757,728 A | 7/1988 | Pitsch | |
| 4,763,747 A | 8/1988 | Muller | |
| 5,141,072 A | 8/1992 | Shibahata | |
| 5,370,588 A | 12/1994 | Sawase et al. | |
| 5,415,598 A | 5/1995 | Sawase et al. | |
| 5,456,641 A | 10/1995 | Sawase | |
| 5,632,185 A | 5/1997 | Gassmann | |
| 5,699,888 A | 12/1997 | Showalter | |
| 5,904,634 A | 5/1999 | Teraoka | |
| 5,910,064 A | 6/1999 | Kuroki | |
| 5,911,291 A | 6/1999 | Suetake et al. | |
| 6,120,407 A | 9/2000 | Mimura | |
| 6,213,241 B1 | 4/2001 | Kita et al. | |
| 6,378,677 B1 | 4/2002 | Kuroda et al. | |
| 6,394,246 B1 | 5/2002 | Gassmann et al. | |
| 6,520,880 B1 | 2/2003 | Fukushima et al. | |
| 6,533,090 B2 | 3/2003 | Osborn et al. | |
| 6,616,566 B2 | 9/2003 | Gorlich | |
| 6,645,108 B1 | 11/2003 | Gradu | |
| 6,951,522 B2 | 10/2005 | Baxter et al. | |
| 6,962,227 B1 * | 11/2005 | Kirkwood | 180/245 |
| 7,080,707 B2 | 7/2006 | Kirkwood | |
| 7,090,608 B2 | 8/2006 | Han | |
| 7,204,781 B2 * | 4/2007 | Hiraku et al. | 475/312 |
| 7,361,113 B2 * | 4/2008 | Puiu et al. | 475/221 |
| 7,415,905 B2 * | 8/2008 | Maguire et al. | 74/339 |
| 2003/0186773 A1 | 10/2003 | Iwazaki et al. | |
| 2005/0266953 A1 | 12/2005 | Puiu | |

* cited by examiner

| DRIVE MODE | FIRST MODE CLUTCH | FIRST ROLLER CLUTCH | SECOND MODE CLUTCH | SECOND ROLLER CLUTCH |
|---|---|---|---|---|
| 1ST | LOCKED | RELEASED | RELEASED | RELEASED |
| 2ND | RELEASED | LOCKED | RELEASED | RELEASED |
| 3RD | LOCKED | RELEASED | RELEASED | LOCKED |
| 4TH | LOCKED | RELEASED | LOCKED | RELEASED |
| 5TH | RELEASED | LOCKED | RELEASED | LOCKED |
| 6TH | RELEASED | RELEASED | LOCKED | RELEASED |
| 7TH | RELEASED | RELEASED | RELEASED | LOCKED |
| 8TH | RELEASED | LOCKED | LOCKED | RELEASED |

FIG. 8

AXLE ASSEMBLY WITH TORQUE VECTORING DRIVE MECHANISM

CROSS-REFERENCE TO RELATED APPLICATIONS

This application is a continuation of U.S. patent application Ser. No. 11/301,083 filed Dec. 12, 2005, which claims the benefit of U.S. Provisional Application No. 60/644,750 filed Jan. 18, 2005. The disclosures of the above applications are incorporated herein by reference.

FIELD OF THE INVENTION

The present invention relates generally to axle assemblies for use in motor vehicles and, more specifically, to an axle assembly equipped with a torque vectoring drive mechanism and an active yaw control system.

BACKGROUND OF THE INVENTION

In view of consumer demand for all-wheel drive vehicles, many different power transfer system are currently utilized for directing motive power ("drive torque") to all four wheels of the vehicle. A number of current generation motor vehicles may be characterized as including an "adaptive" power transfer system that is operable for automatically directing power to the secondary driveline, without any input from the vehicle operator, when traction is lost at the primary driveline. Typically, such adaptive torque control results from variable engagement of an electrically or hydraulically operated transfer clutch based on the operating conditions and specific vehicle dynamics detected by sensors associated with an electronic traction control system. In conventional rear-wheel drive (RWD) vehicles, the transfer clutch is typically installed in a transfer case for automatically transferring drive torque to the front driveline in response to slip in the rear driveline. Similarly, the transfer clutch can be installed in a power transfer device, such as a power take-off unit (PTU) or in-line torque coupling, when used in a front-wheel drive (FWD) vehicle for transferring drive torque to the rear driveline in response to slip in the front driveline. Such adaptively-controlled power transfer system can also be arranged to limit slip and bias the torque distribution between the front and rear drivelines by controlling variable engagement of a transfer clutch that is operably associated with a center differential installed in the transfer case or PTU.

To further enhance the traction and stability characteristics of motor vehicles, it is also known to equip such vehicles with brake-based electronic stability control systems and/or traction distributing drive axle assemblies. Typically, such drive axle assemblies include a drive mechanism that is operable for adaptively regulating the side-to-side (i.e., left-right) torque and speed characteristics between a pair of drive wheels. In some instances a pair of modulatable clutches are used to provide this side-to-side control, as is disclosed in U.S. Pat. Nos. 5,911,291, 6,378,677 and 5,699,888. According to an alternative drive axle arrangement, U.S. Pat. No. 6,520,880 discloses a hydraulically-operated traction distribution assembly.

As part of the ever increasing sophistication of adaptive power transfer stability control systems, greater attention is currently being given to the yaw control and stability enhancement features that can be provided by such traction distributing drive axles. Accordingly, this invention is intended to address the need to provide design alternatives which improve upon the current technology.

SUMMARY OF THE INVENTION

Accordingly, it is an objective of the present invention to provide a drive axle assembly for use in motor vehicles which are equipped with an adaptive yaw and stability control system.

To achieve this objective, the drive axle assembly of the present invention includes a pair of axleshafts connected to a pair of wheels, and a drive mechanism that is operable to selectively couple a driven input shaft to one or both of the axleshafts. In particular, the drive mechanism includes first and second drive units that can be selectively engaged to control the magnitude of the drive torque transferred and the relative rotary speed between the input shaft and the axleshafts. Each drive unit includes a planetary gearset that is operably disposed between the input shaft and its corresponding axleshaft, a bi-directional roller clutch for selectively locking the planetary gearset to establish a direct drive connection between the input shaft and the axleshaft, and a mode clutch that may be modulated for causing the planetary gearset to establish variable speed ratio drive connections between the input shaft and the axleshaft. Each mode clutch includes a multi-plate clutch pack and a power-operated actuator to control the engagement force applied to the clutch pack. A control system including an electronic control unit (ECU) and sensors are provided to control actuation of the mode clutches so as to control the side-to-side traction characteristics of the drive axle assembly.

Further objectives and advantages of the present invention will become apparent by reference to the following detailed description of the preferred embodiment and the appended claims when taken in conjunction with the accompanying drawings.

BRIEF DESCRIPTION OF THE DRAWINGS

The present invention will become more fully understood from the detailed description and the accompanying drawings, wherein:

FIG. 8 is a table listing the available operational drive modes established by the drive axle assembly and yaw and stability control system of the present invention;

DETAILED DESCRIPTION OF THE PREFERRED EMBODIMENTS

Figure 1:
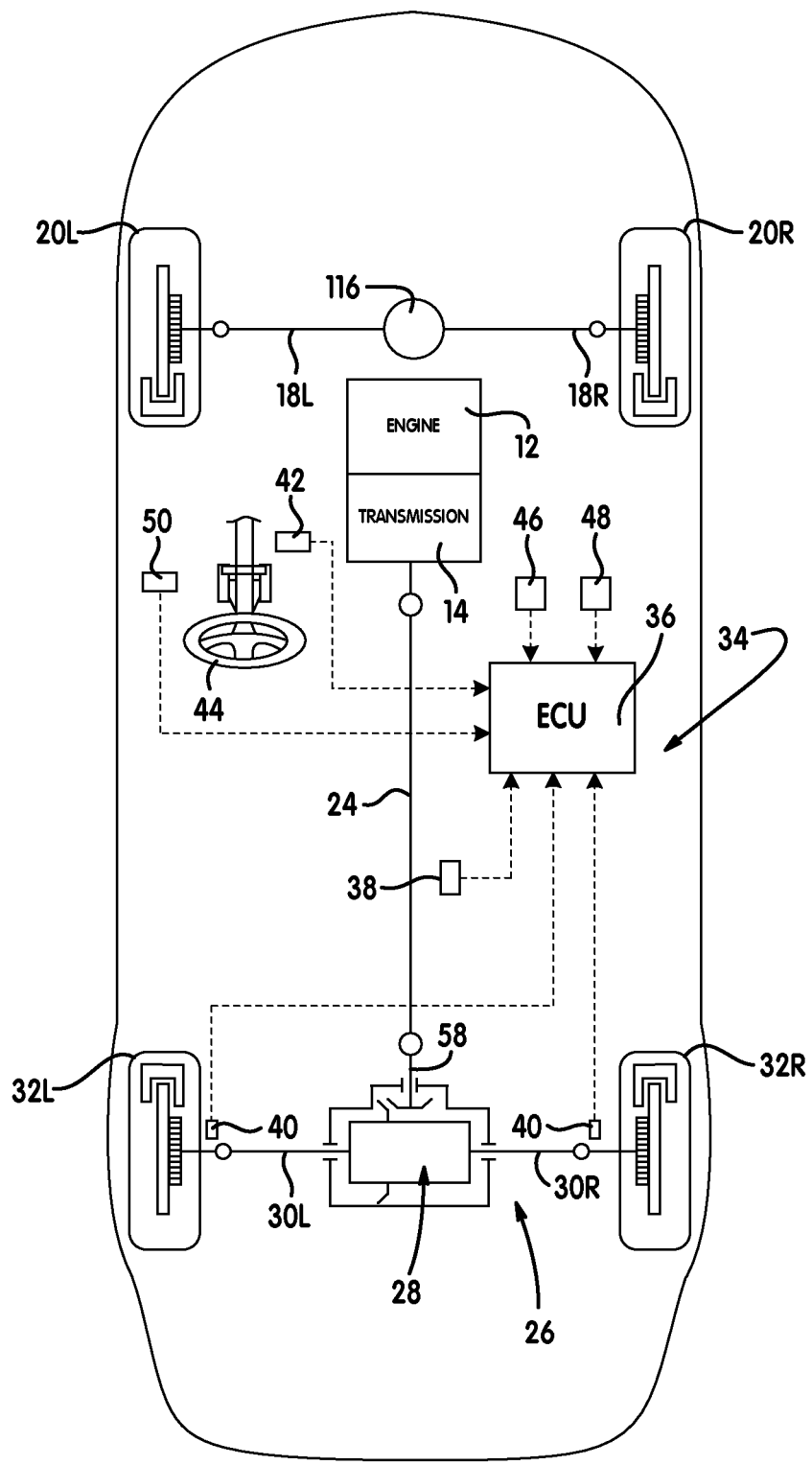
FIG. 1 is a diagrammatical illustration of a rear-wheel drive motor vehicle equipped with a torque vectoring drive axle assembly and the yaw and stability control system of the present invention.

Referring to FIG. 1, a motor vehicle 10 includes an engine 12 mounted in a front portion of a vehicle body, a transmission 14 driven by engine 12, a front differential 16 which connects axleshafts 18L and 18R to left and right front wheels 20L and 20R and a propshaft 24 interconnecting transmission 14 to a rear axle assembly 26. Rear axle assembly 26 includes a drive mechanism 28 which connects propshaft 24 to axleshafts 30L and 30R for driving left and right rear wheels 32L and 32R. As will be detailed, drive mechanism 28 is operable in association with a yaw control system 34 for controlling the transmission of drive torque through axleshafts 30L and 30R to rear wheels 32L and 32R. Rear drive mechanism 28 is capable of varying the magnitude of drive torque to one or both of left and right rear wheels 32L and 32R to any extent.

In addition to an electronic control unit (ECU) 36, yaw control system 34 includes a plurality of sensors for detecting various operational and dynamic characteristics of vehicle 10. For example, a vehicle speed sensor 38 is provided for detecting a vehicle speed value based on rotation of propshaft 24, a pair of rear wheel speed sensors 40 are operable to detect the individual rear wheel speed values based rotation of left and right axleshafts 30L and 30R, and a steering angle sensor 42 is provided to detect a steering angle of a steering wheel 44. The sensors also include a yaw rate sensor 46 for detecting a yaw rate of the body portion of vehicle 10, a lateral acceleration sensor 48 for detecting a lateral acceleration of the vehicle body, and a lock switch 50 for permitting the vehicle operator to intentionally shift drive mechanism 28 into a locked mode. As will be detailed, ECU 36 controls operation of left and right drive units 52L and 52R associated with drive mechanism 28 by utilizing a control strategy that is based on input signals from the various sensors and lock switch 50.

Drive mechanism 28 includes a casing 56 within which left drive unit 52L and right drive unit 52R are located. As seen, an input shaft 58 is connected to propshaft 24 and extends into and is rotatably supported by casing 56. Input shaft 58 includes a pinion gear 60 that is in constant mesh with a hypoid ring gear 62. Ring gear 62 is fixed to a drive hub 64 which, in turn, is fixed for rotation with a transfer shaft 66. Left drive unit 52L is operably arranged to selectively transfer drive torque from transfer shaft 66 to left axleshaft 30L. Likewise, right drive unit 52R is operably arranged to selectively transfer drive torque from transfer shaft 66 to right axleshaft 30R. Since the left and right drive units are substantially mirror-imaged arrangements, only the components of left drive unit 52L will be described in detail with it understood that the common components are identified using "L" and "R" suffixes to designate "left" and "right".

Figure 2:
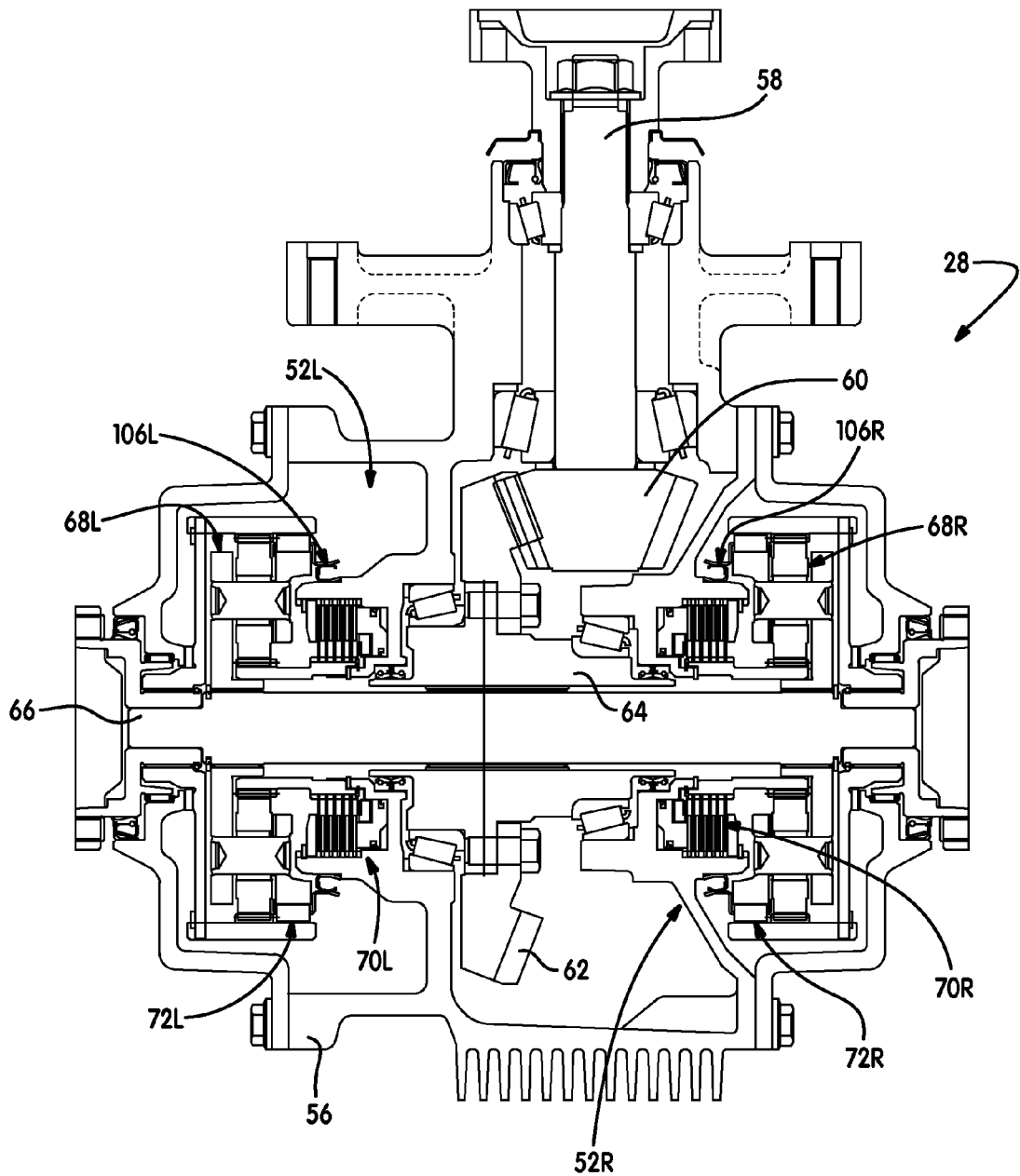
FIG. 2 is a sectional view of the torque vectoring drive axle assembly.
Figure 3A:
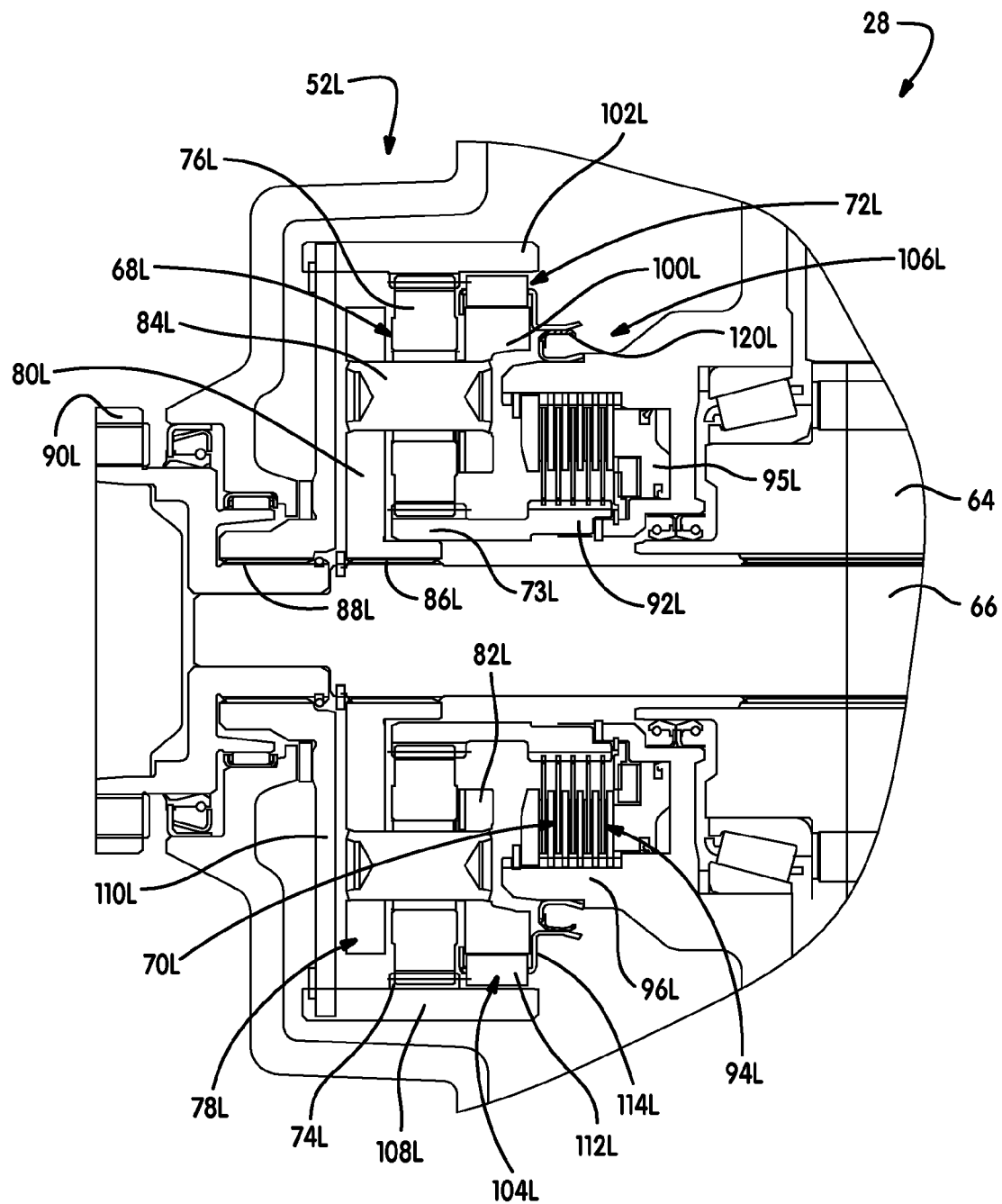
FIGS. 3A and 3B are enlarged portions of FIG. 2 showing the components of the left and right drive units of the drive axle assembly in greater detail.
Figure 6:
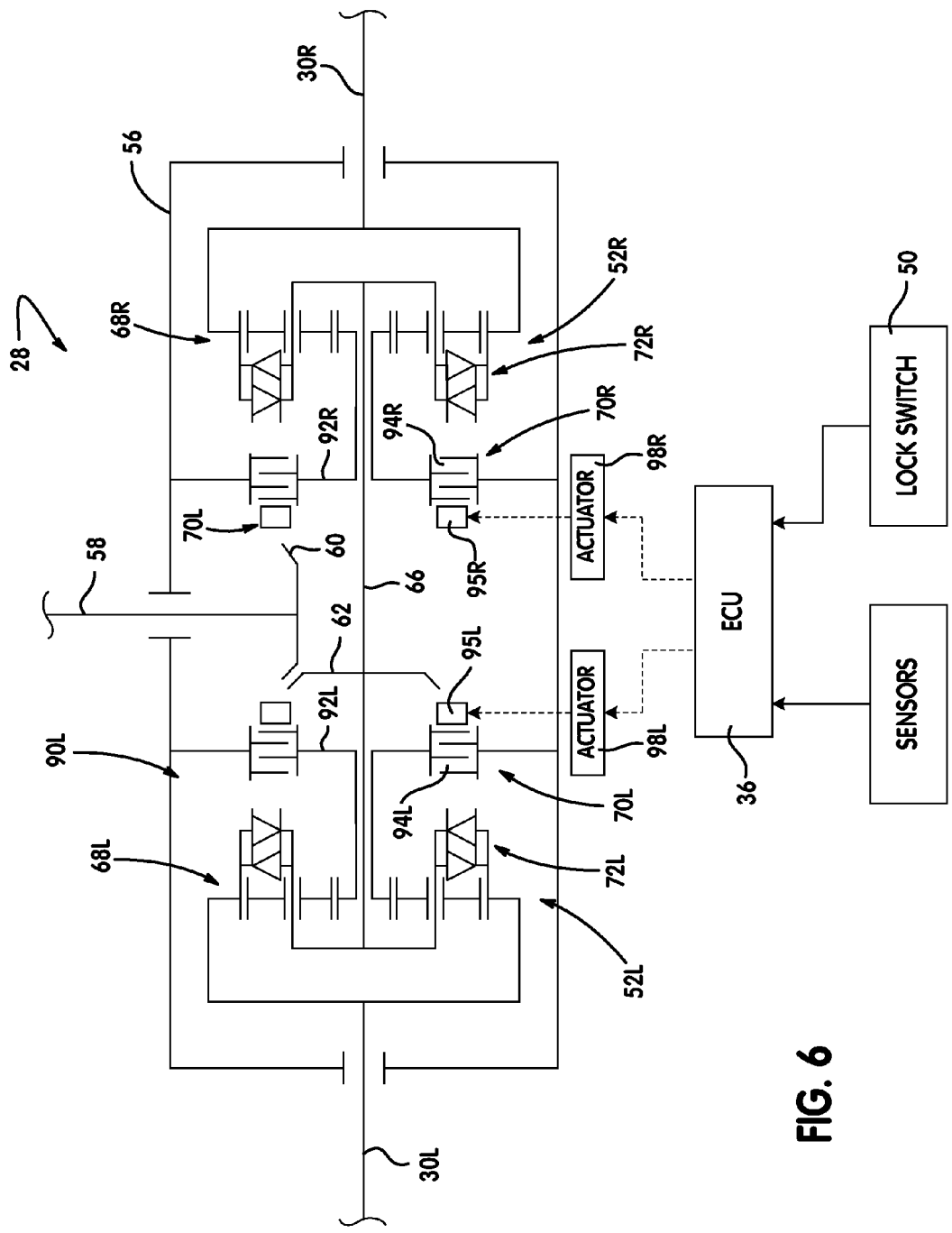
FIG. 6 is a skeletal stick diagram of the drive axle assembly shown in FIG. 2.

Referring primarily to FIGS. 2, 3A and 6, left drive unit 52L is shown to generally include a planetary gearset 68L, a mode clutch 70L and a bi-directional overrunning roller clutch 72L. Planetary gearset 68L has a sun gear 73L, a ring gear 74L and a plurality of planet gears 76L meshed therewith which are rotatably supported from a planet carrier 78L. Planet carrier 78L includes a first carrier ring 80L interconnected to a second carrier ring 82L and further includes pinion shafts 84L on which planet gears 76L are rotatably supported. As seen, first carrier ring 80L of planet carrier 78L is fixed via a spline connection 86L for rotation with transfer shaft 66 so as to act as the input member of gearset 68L. Likewise, ring gear 74L is fixed via a spline connection 88L to an output yoke 90L which, in turn, is fixed for rotation with axleshaft 30L so as to act as the output member of gearset 68L.

Mode clutch 70L is operably arranged between sun gear 73L and casing 56 and acts as a brake device. Mode clutch 70L includes a clutch hub 92L fixed for rotation with sun gear 73L, a multi-plate clutch pack 94L disposed between hub 92L and a drum segment 96L of casing 56, an apply member 95L for applying a clutch engagement force on clutch pack 94L, and a power-operated clutch actuator 98L for controlling movement of apply member 95L relative to clutch pack 94L. Mode clutch 70L is operable in a first or "released" mode so as to permit unrestricted rotation of sun gear 73L such that no drive torque is transferred from transfer shaft 66 through gearset 68L to left axleshaft 30L. In contrast, mode clutch 70L is also operable in a second or "locked" mode for preventing rotation of sun gear 73L such that left axleshaft 30L is overdriven relative to transfer shaft 66 at an increased speed ratio that is established by the meshed gear components of planetary gearset 68L. Mode clutch 70L is shifted between its released and locked modes via actuation of power-operated actuator 98L in response to control signals from ECU 36. In particular, mode clutch 70L is defined to be operating in its released mode when power-operated clutch actuator 98L causes apply member 95L to apply a minimum clutch engagement force on clutch pack 94L and in its locked mode when clutch actuator 98L causes apply member 95L to apply a maximum clutch engagement force on clutch pack 94L.

Figure 4:
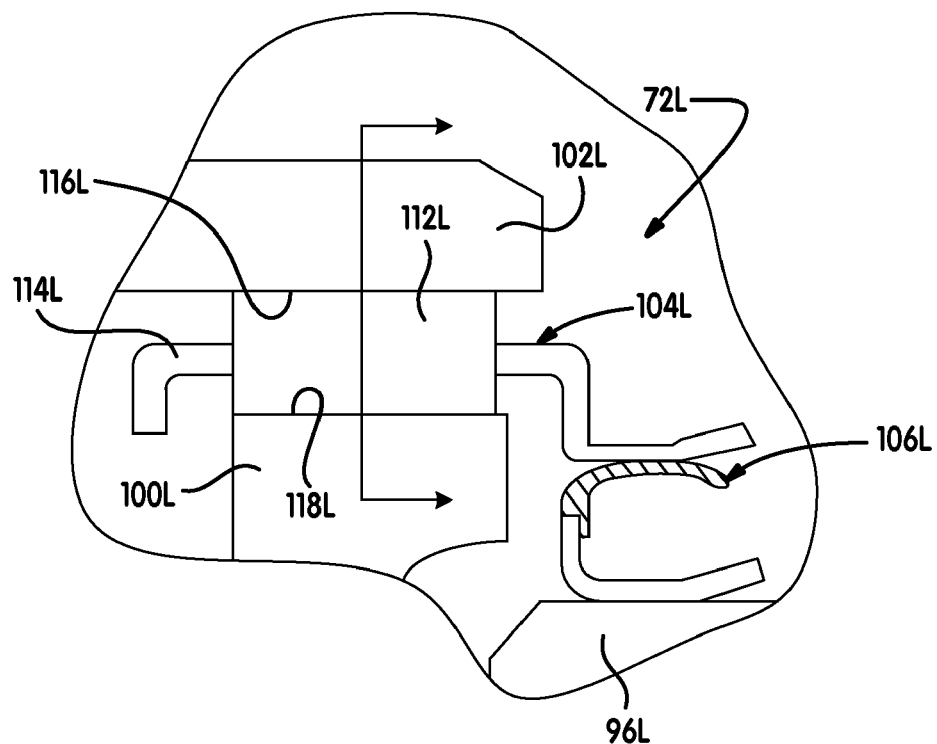
FIG. 4 is a further enlargement of a portion of FIG. 3A showing the components of the bi-directional roller clutch associated with the left drive unit of the drive axle assembly.
Figure 5:
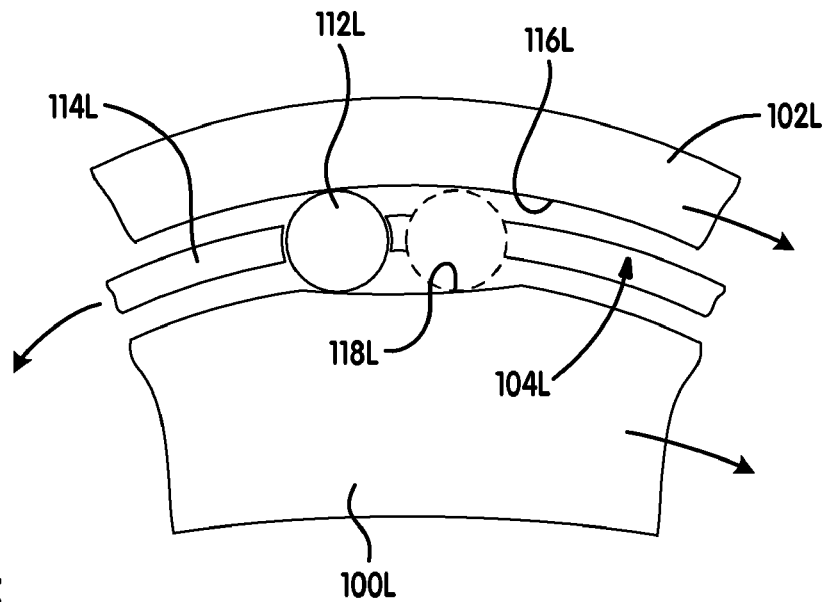
FIG. 5 is a sectional view taken along line A-A of FIG. 4.

Bi-directional roller clutch 72L is adapted to be operably disposed between any two components of gearset 68L. In particular, roller clutch 72L is shown to be operably arranged between ring gear 74L and planet carrier 78L. Bi-directional roller clutch 72L is operable in a first or "released" mode to permit unrestricted rotation of ring gear 74L relative to carrier 78L. In contrast, bi-directional roller clutch 72L is also operable in a second or "locked" mode for preventing relative rotation between ring gear 74L and planet carrier 78L, thereby effectively locking planetary gearset 68L and establishing a direct speed ratio drive connection between transfer shaft 66 and left axleshaft 30L. Bi-directional roller clutch 72L is best shown in FIGS. 3A, 4 and 5 to include an inner race member 100L, an outer race member 102L, a caged roller assembly 104L and an actuator 106L. Inner race member 100L is shown to be an annular ring that is fixed to or formed integrally with second carrier ring 82L of planet carrier 78L. As such, inner race member 100L is adapted to rotate in common with planet carrier 78L at the rotary speed of transfer shaft 66. Outer race member 102L is part of a cylindrical drum 108L to which ring gear 74L is fixed to or formed integrally therewith. As seen, drum 108L is secured to an outer end segment of a drive plate 110L which has its inner end segment fixed via spline connection 88L to yoke 90L.

Caged roller assembly 104L includes a plurality of rollers 112L retained within a cage 114L and which are disposed between a cylindrical inner wall surface 116L of outer race member 102L and a corresponding plurality of cam surfaces 118L formed on the cylindrical outer wall surface of inner race member 100L. In addition, actuator 106L includes a mechanism for causing limited circumferential indexing of caged roller assembly 104L relative to inner race member 100L for normally moving roller 112L to an engaged position (See FIG. 5). In this engaged position. bi-directional roller clutch 72L is in its locked mode, for coupling ring gear 74L for common rotation with planet carrier 78L, thereby locking planetary gearset 68L. Actuator 106L is shown to include an annular drag seal 120L that is mounted on drum segment 96L of casing 56 and which engages a ring segment 122L of cage 114L. The frictional drag force imparted by drag seal 120L on cage 114L functions to provide bi-directional locking of outer race 102L to inner race 100L which, as noted, functions to lock planetary gearset 68L. This bi-directional locking function is based on the rotary direction that transfer shaft 66 is driven by the powertrain. As will be detailed, actuation of mode clutch 70L will cause rollers 112L to move out of the engaged position and into a "released" position (shown in phantom in FIG. 5) so as to permit relative rotation between ring gear 74L and planet carrier 78L.

Figure 3B:
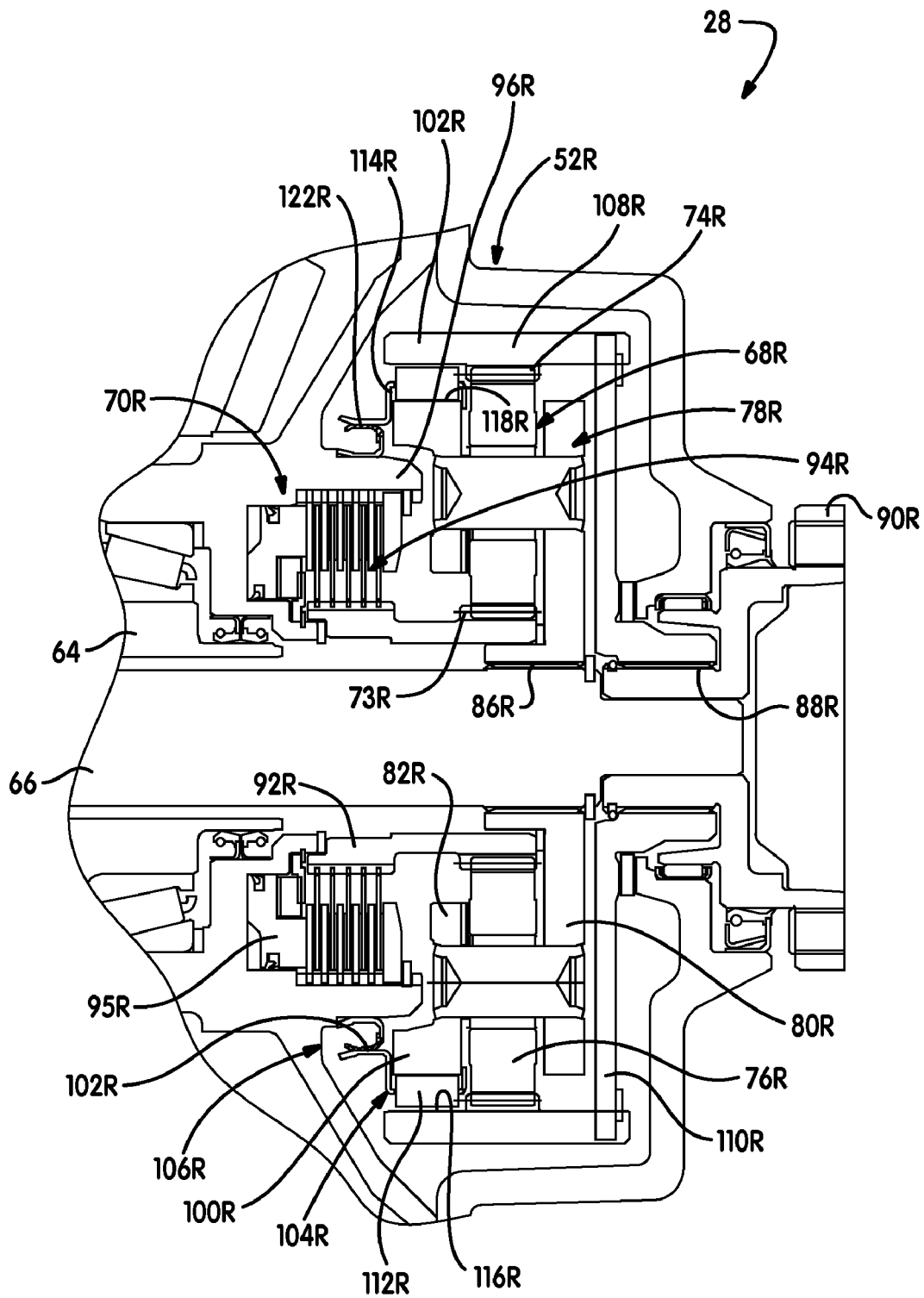

Referring primarily to FIGS. 2, 3B and 6, the components of right drive unit 52R are shown to basically be identical to those of left drive unit 52L and include a planetary gearset 68R, a second mode clutch 70R, and a second bi-directional roller clutch 72R. Second mode clutch 70R includes a hub 92R fixed for rotation with sun gear 73R, a multi-plate clutch pack 94R, an apply member 95R for applying a clutch engagement force on clutch pack 94R, and a power-operated clutch actuator 98R for controlling movement of apply member 95R relative to clutch pack 94R. Second mode clutch 70R is operable in a first or "released" mode to prevent unrestricted rotation of sun gear 73R such that no drive torque is transferred from transfer shaft 66 to right axleshaft 30R. In contrast, second mode clutch 70R is also operable in a second or "locked" mode for preventing rotation of sun gear 73R such that right axleshaft 30R is overdriven relative to transfer shaft 66 at an increased speed ratio established by gearset 68R. Power-operated clutch actuator 98R is operable to shift second mode clutch 70R between its released and locked modes in response to control signals from ECU 36. In particular, second mode clutch 70R is operable in its released mode when clutch actuator 98R causes apply member 95R to apply a minimum clutch engagement force on clutch pack 94R and is further operable in its locked mode when clutch actuator 98R causes apply member 95R to apply a maximum clutch engagement force on clutch pack 94R.

Second bi-directional overrunning roller clutch 72R is likewise adapted to be operably disposed between any two rotary components of planetary gearset 68R. Preferably, roller clutch 72R is operably arranged between ring gear 74 and planet carrier 78R. Bi-directional roller clutch 72R is operable in a first or "released" mode to permit unrestricted rotation of ring gear 4R relative to carrier 78R. In contrast, bi-directional clutch 72R is operable in a second or "locked" mode for preventing relative rotation between ring gear 74R and planet carrier 78R, thereby locking gearset 98R and establishing a direct speed ratio drive connection between transfer shaft 66 and right axleshaft 30R.

Bi-directional roller clutch 72R includes an inner race member 100R, an outer race member 102RL, a caged roller assembly 104R and an actuator 106R. Inner race member 100R is shown as an annular ring segment that is fixed to or formed integrally with second carrier ring 82R of planet carrier 78R. As such, inner race member 100R is adapted to rotate in common with planet carrier 78RL at the rotary speed of transfer shaft 66. Outer race member 102R is part of cylindrical drum 108R to which ring gear 74R is fixed to or formed integrally therewith. As seen, drum 108R is secured to an outer end segment of a drive plate 110R having its inner end segment fixed via spline connection 88R to yoke 90R. Caged roller assembly 104R includes a plurality of rollers 112R retained within a cage 114R and which are disposed between a cylindrical inner wall surface 116R of outer race member 102R and a corresponding plurality of cam surfaces 118R formed on the cylindrical outer wall surface of inner race member 100R.

Actuator 106R includes a mechanism for causing limited circumferential indexing of caged roller assembly 104R relative to inner race member 100R for normally moving roller 112R to an engaged position. In this engaged position, bi-directional roller clutch 72R is in its locked mode, thereby coupling ring gear 74R for common rotation with planet carrier 78R and locking planetary gearset 68R. Actuator 106R is shown to include an annular drag seal 120R that is mounted on drum segment 96R of casing 56 and which engages a ring segment 122R of cage 114R. The frictional drag force imparted by drag seal 120R on cage 114R functions to provide bi-directional locking of outer race 102R to inner race 100R which, as noted, functions to lock planetary gearset 68R. As will be detailed, actuation of mode clutch 70R will cause rollers 112R to move out of the engaged position so as to permit relative rotation between ring gear 74R and planet carrier 78R.

Figure 7:
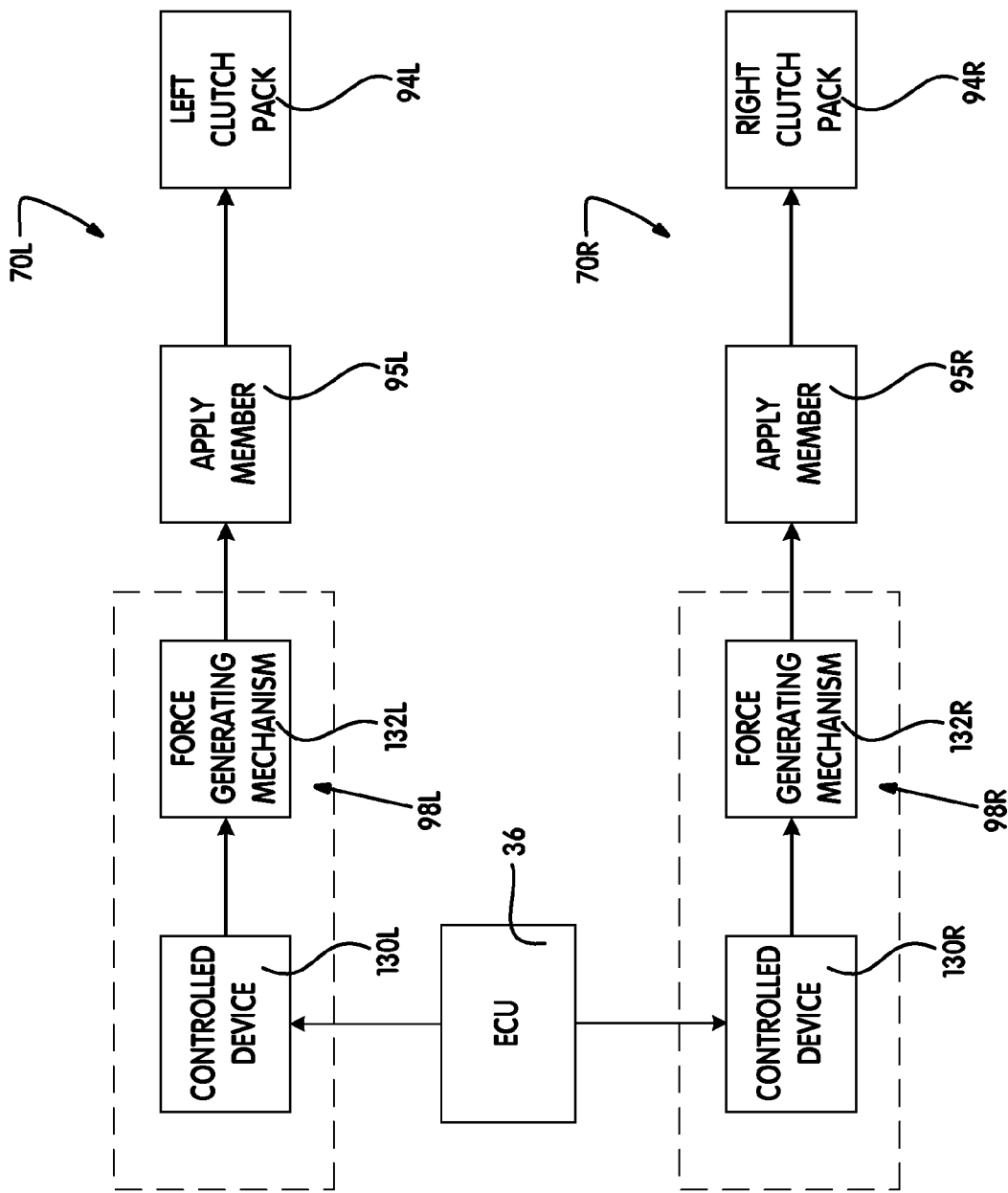
FIG. 7 is a block diagram disclosing the components of the power-operated clutch actuator for the mode clutch in each of the left and right drive units of the drive axle assembly.

As seen, power-operated clutch actuators 98L and 98R are shown in FIG. 6 in a schematic fashion to cumulatively represent the components required to accept a control signal from ECU 36 and generate the clutch engagement force to be applied by the apply members to the corresponding clutch packs. To this end, FIG. 7 diagrammatically illustrates the basic components associated with power-operated clutch actuators 98L and 98R. Specifically, power-operated clutch actuators 98L and 98R each include a corresponding controlled device 130L and 130R and a force generating mechanism 132L and 132R. In electro-mechanical systems, controlled devices 130L and 132R would represent such components as, for example, an electric motor or an electromagnetic solenoid assembly capable of receiving an electric control signal from ECU 36. The output of controlled devices 130L and 130R would actuate force generating mechanisms 132L and 132R comprised of, for example, a ballramp, a ball screw, a leadscrew, a pivotal lever arm, rotary cam plates, etc., that are capable of converting the output into the desired clutch engagement force. If a hydro-mechanical system is used, controlled devices 130L and 130R would include a flow or pressure control valve operable for regulating the delivery of pressurized fluid from a fluid source to a piston chamber. A piston disposed for movement in the piston chamber would act as the force generating mechanism. Preferably, controlled devices 130L and 130R are capable of receiving variable electric control signals from ECU 36 for permitting modulation of the magnitude of the clutch engagement force generated and applied to the clutch packs so as to permit "adaptive" control of the mode clutches.

In accordance with the arrangement shown, drive mechanism 28 is operable in coordination with yaw control system 34 to potentially establish at a plurality of distinct operative modes for controlling the transfer of drive torque from input shaft 58 to axleshafts 30L and 30R. To this end, a number of distinct operative modes will now be described, with the table provided in FIG. 8 depicting the operational status of each of the clutches required to establish these drive modes.

A first operative drive mode can be established when first mode clutch 70L is in its locked mode and each of the remaining clutches are in their released mode. As such, right drive unit 52R is disconnected such that no drive torque is delivered from transfer shaft 66 to right axleshaft 30R while left drive unit 52L causes left axleshaft 30L to be overdriven relative to transfer shaft 66. When this drive mode is selected, right rear wheel 32R is free to rotate relative to left rear wheel 32L which, in turn, is being overdriven in relation to transfer shaft 66.

A second operative drive mode can be established with first roller clutch 72L in its locked mode and all of the other clutches in their released modes. In this drive mode, left drive unit 52L causes left axleshaft 30L to be commonly driven at a direct speed ratio with transfer shaft 66 while right drive unit 52R is disconnected such that no drive torque is transmitted from transfer shaft 66 to right axleshaft 30R. This second drive mode is similar to the first drive mode except that left rear wheel 32L is directly driven instead of overdriven relative to the rotary speed of transfer shaft 66.

A third operative drive mode can be established when first mode clutch 70L and second roller clutch 72R are shifted into their locked modes while first roller clutch 72L and second mode clutch 70R are shifted into their released modes. In this third drive mode, left drive unit 52L functions to overdrive left axleshaft 30L relative to transfer shaft 66 while right drive unit 52R couples right axleshaft 30R for common rotation with transfer shaft 66. Thus, unequal drive torque is being delivered to rear wheels 32L and 32R with left rear wheel 32L being overdriven relative to right rear wheel 32R.

To establish a fourth operative drive mode, first mode clutch 70L and second mode clutch 70R are shifted into their locked modes while both bi-directional roller clutches 72L and 72R are shifted into their released modes. In this fourth drive mode, both drive units are engaged such that each gearset 68L and 68R functions to overdrive its corresponding axleshaft 30L and 30R relative to the rotary speed of transfer shaft 66. In essence, this mode establishes a locked four-wheel overdrive mode since rear wheels 32L and 32R are being overdriven. Preferably, the gear ratios established by gearsets 68L and 68R are identical.

To establish a fifth operative drive mode, first roller clutch 72L and second roller clutch 72R are shifted into their locked modes while first and second mode clutches 70L and 70R are shifted into their released modes. In this fifth drive mode, left drive unit 52L couples left axleshaft 30L for common rotation with transfer shaft 66 while right drive unit 52R similarly couples right axleshaft 30R for common rotation with transfer shaft 66. As such, a locked direct drive mode is established since rear wheels 32L and 32R are commonly driven. In the event of failure of clutch actuators 98L, 98R, this drive mode provides a "fail-safe" mode for transmitting drive torque to rear wheels 32L and 32R.

A sixth operative drive mode can be established with second mode clutch 70R shifted into its locked mode while all of the other mode clutches are shifted into their released modes. As such, left drive unit 52L is disconnected such that no drive torque is transferred to left axleshaft 30L while right drive unit 52R functions to overdrive axleshaft 30R relative to transfer shaft 66.

A seventh operative drive mode can be established when second roller clutch 72R is locked and all of the other clutches are released. As such, right drive unit 52R functions to couple axleshaft 30R for direct rotation with transfer shaft 66 while left drive unit 52L is disconnected such that no drive torque is transmitted to left axleshaft 30L.

An eight drive mode can be established when first roller clutch 72L and second mode clutch 70R are locked and first mode clutch 70L and second roller clutch 72R are released. Thus, right drive unit 52R functions to overdrive right axleshaft 30R while left drive unit 52L drives left axleshaft 30L at the same rotary speed as transfer shaft 66.

In addition to on-off control of the bi-directional overrunning roller clutches and the mode clutches to establish the various drive modes associated with direct and overdrive connections through the planetary gearsets, it is further contemplated that variable clutch engagement forces can be generated by power-operated clutch actuators 98L and 98R to adaptively control the left-to-right speed and torque characteristics. This adaptive control feature functions to provide enhanced yaw and stability control for vehicle 10. For example, a "reference" yaw rate can be determined based on the steering angle detected by steering angle sensor 42, a vehicle speed calculated based on signals from the vehicle speed sensor 38, and a lateral acceleration detected by lateral acceleration sensor 48 during turning of vehicle 10. ECU 36 compares this reference yaw rate with an "actual" yaw rate detected by yaw sensor 46. This comparison will determine whether vehicle 10 is in an understeer or an oversteer condition so as to permit yaw control system 34 to accurately adjust or accommodate for these types of steering tendencies. ECU 36 can address such conditions by shifting drive mechanism 28 into the specific operative drive mode that is best suited to correct the actual or anticipated oversteer or understeer situation. Optionally, variable control of the mode clutches also permits adaptive regulation of the side-to-side torque and speed characteristics if one of the distinct drive modes is not adequate to accommodate the current steer tractive condition.

According to this preferred construction for drive mechanism 28, the bi-directional roller clutches are arranged to keep each of the planetary gearsets locked when drive torque is being transferred since the drag seals provide this self-locking feature in both directions (i.e., forward and reverse) of torque transfer. Specifically, the drag seals function to keep the caged roller assemblies in their engaged positions, opposing the direction of wheel rotations, during rolling movement of the wheels. Overrunning the roller clutches will cause the caged roller assembly to circumferentially index until the rollers are released from their engaged position. As noted, actuation of the mode clutches results in such overrunning of the roller clutches to permit adaptive side-to-side torque vectoring control or provide continuous speed differentiation to simulate the function of a differential. Also, while the roller clutches are shown to be operably disposed between the carrier and ring gear of each planetary gearset, the may be alternatively positioned between the carrier and the sun gear to lock the gearsets.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A motor vehicle, comprising:
a powertrain operable for generating drive torque; and
a driveline for selectively transmitting drive torque from said powertrain to first and second wheels, said driveline including an input shaft driven by said powertrain, a first axleshaft driving said first wheel, a second axleshaft driving said second wheel, and a drive mechanism for selectively coupling said input shaft to one or both of said first and second axleshafts, said drive mechanism including a transfer shaft driven by said input shaft and first and second drive units, said first drive unit including a first planetary gearset, a first mode clutch and a first overrunning clutch, said first planetary gearset is operably disposed between said transfer shaft and said first axleshaft, said first mode clutch is operably associated with said first planetary gearset to establish variable speed drive connections between said transfer shaft and said first axleshaft, and said first overrunning clutch is operable to selectively lock-up said first planetary gearset to establish a direct drive connection between said transfer shaft and said first axleshaft, said second drive unit including a second planetary gearset, a second mode clutch and a second overrunning clutch, said second planetary gearset is operably disposed between said transfer shaft and said second axleshaft, said second mode clutch is operably associated with said second planetary gearset to establish variable speed drive connections between said transfer shaft and said second axleshaft, and said second overrunning clutch is operable to selectively lock-up said second planetary gearset to establish a direct drive connection between said transfer shaft and said second axleshaft.

2. The motor vehicle of claim 1 wherein said drive mechanism is operable to establish a first overdrive mode when said first mode clutch is engaged and each of said second mode clutch and said first and second overrunning clutches are released such that said first axleshaft is overdriven relative to said transfer shaft and said second axleshaft is uncoupled from driven connection with said transfer shaft.

3. The motor vehicle of claim 2 wherein said drive mechanism is operable to establish a second overdrive mode when said second mode clutch is engaged and each of said first mode clutch and said first and second overrunning clutches are released such that said second axleshaft is overdriven relative to said transfer shaft and said first axleshaft is uncoupled from driven connection with said transfer shaft.

4. The motor vehicle of claim 3 wherein said drive mechanism is operable to establish a third overdrive mode when said first and second mode clutches are engaged and said first and second overrunning clutches are released such that both of said first and second axleshafts are overdriven relative to said transfer shaft.

5. The motor vehicle of claim 1 wherein said drive mechanism is operable to establish a first drive mode when said first overrunning clutch is engaged and each of said first and second mode clutches and said second overrunning clutch are released such that said first axleshaft is driven by said transfer shaft while said second axleshaft is uncoupled from driven connection to said transfer shaft.

6. The motor vehicle of claim 5 wherein said drive mechanism is operable to establish a second drive mode when said second overrunning clutch is engaged and each of said first and second mode clutches and said first overrunning clutch are released such that said second axleshaft is driven relative to said transfer shaft while said first axleshaft is uncoupled from driven connection with said transfer shaft.

7. The motor vehicle of claim 1 wherein said first planetary gearset includes a first carrier driven by said transfer shaft, a first sun gear, a first ring gear driving said first axleshaft, and a set of first planet gears rotatably supported by said first carrier and meshed with said first sun gear and said first ring gear, wherein said first mode clutch is operable to selectively brake rotation of said first sun gear, and wherein said first overrunning clutch is operable to releaseably couple said first ring gear to said first carrier.

8. The motor vehicle of claim 7 wherein said second planetary Gearset includes a second carrier driven by said transfer shaft, a second sun gear, a Second ring gear driving said second axleshaft, and a set of second planet gears rotatably supported by said second carrier and meshed with said second sun gear and said second ring gear, wherein said second mode clutch is operable to selectively brake rotation of said second sun gear, and wherein said second overrunning clutch is operable to releaseably couple said second ring gear to said second carrier.

9. The motor vehicle of claim 7 wherein said first overrunning clutch includes a first race member driven by said first carrier, a second race member driving said first ring gear, locking members disposed between said first and second race members, and an actuator for normally urging said locking members into locked engagement with said first and second race members.

10. The motor vehicle of claim 9 wherein said actuator includes a drag spring adapted to apply a drag force on said locking members.

11. A drive axle assembly for use in a motor vehicle having a powertrain and a first and second wheels, comprising:
an input shaft driven by the powertrain;
a first axleshaft driving the first wheel;
a second axleshaft driving the second wheel;
a transfer shaft driven by said input shaft;
a first drive unit including a first planetary gearset, a first overrunning clutch and a first mode clutch, said first planetary gearset is operably disposed between said transfer shaft and said first axleshaft, said first overrunning clutch is operable to selectively lock-up said first planetary gearset, and said first mode clutch is operable to selectively engage a member of said first planetary gearset to establish variable speed drive connections between said transfer shaft and said first axleshaft;
a second drive unit including a second planetary gearset, a second overrunning clutch and a second mode clutch, said second planetary gearset is operably disposed between said transfer shaft and said second axleshaft, said second overrunning clutch is operable to selectively lock-up said second planetary gearset, and said second mode clutch is operable to selectively engage a member of said second planetary gearset to establish variable speed drive connections between said transfer shaft and said second axleshaft; and
a control system for controlling actuation of said first and second mode clutches.

12. The drive axle assembly of claim 11 wherein a first overdrive mode is established when said first mode clutch is engaged and each of said remaining clutches are released such that said first axleshaft is overdriven relative to said transfer shaft while said second axleshaft is uncoupled from driven connection with said transfer shaft.

13. The drive axle assembly of claim 12 wherein a second overdrive mode is established when said second mode clutch is engaged and each of said remaining clutches is released such that said second axleshaft is overdriven relative to said transfer shaft while said first axleshaft is uncoupled from driven connection with said transfer shaft.

14. The drive axle assembly of claim 13 wherein a third overdrive mode is established when said first and second mode clutches are engaged and said first and second overrunning clutches are released such that both of said first and second axleshafts are overdriven relative to said transfer shaft.

15. The drive axle assembly of claim 11 wherein a first drive mode is established when said first overrunning clutch is engaged and each of said remaining clutches is released such that said first axleshaft is driven by said transfer shaft while said second axleshaft is uncoupled from driven connection to said transfer shaft.

16. The drive axle assembly of claim 15 wherein a second drive mode is established when said second overrunning clutch is engaged and each of said remaining clutches is released such that said second axleshaft is driven relative to said transfer shaft while said first axleshaft is uncoupled from driven connection with said transfer shaft.

17. The drive axle assembly of claim 16 wherein a third drive mode is established when said first and second overrunning clutches are engaged and said first and second mode clutches are released such that both of said first and second axleshafts are driven by said transfer shaft.

18. The motor vehicle of claim 11 wherein said first planetary gearset includes a first carrier driven by said transfer shaft, a first sun gear, a first ring gear driving said first axleshaft, and a set of first planet gears rotatably supported by said first carrier and meshed with said first sun gear and said first ring gear, wherein said first mode clutch is operable to selectively brake rotation of said first sun gear, and wherein said first overrunning clutch is operable to releaseably couple said first ring gear to said first carrier.

19. The motor vehicle of claim 18 wherein said second planetary gearset includes a second carrier driven by said transfer shaft, a second sun gear, a second ring gear driving said second axleshaft, and a set of second planet gears rotatably supported by said second carrier and meshed with said second sun gear and said second ring gear, wherein said second mode clutch is operable to selectively brake rotation of said second sun gear, and wherein said second overrunning clutch is operable to releaseably couple said second ring gear to said second carrier.

20. The motor vehicle of claim 18 wherein said first overrunning clutch includes a first race member driven by said first carrier, a second race member driving said first ring gear, locking members disposed between said first and second race members, and an actuator for normally urging said locking members into locked engagement with said first and second race members.

21. The motor vehicle of claim 20 wherein said actuator includes a drag spring adapted to apply a drag force on said locking members.

22. A motor vehicle, comprising:
a powertrain operable for generating drive torque;
a driveline for selectively transmitting drive torque from said powertrain to first and second wheels, said driveline including an input shaft driven by said powertrain, a first axleshaft driving said first wheel, a second axleshaft driving said second wheel, and a drive mechanism for selectively coupling said input shaft to one or both of said first and second axleshafts, said drive mechanism including a transfer shaft driven by said input shaft and first and second drive units operably disposed between said transfer shaft and said first and second axleshafts, said first drive unit including a first planetary gearset, a first mode clutch and a first overrunning clutch, said first planetary gearset having a first input component driven by said transfer shaft, a first reaction component and a first output component driving said first axleshaft, said first mode clutch is operable to selectively brake rotation of said first reaction component and said first overrunning clutch is operable to selectively couple said first output component for rotation with said first input component, said second drive unit including a second planetary gearset, a second mode clutch and a second overrunning clutch, said second planetary gearset having a second input component driven by said transfer shaft, a second reaction component and a second output component driving said second axleshaft, said second mode clutch is operable to selectively brake rotation of said second reaction component and said second overrunning clutch is operable to selectively couple said second output component for rotation with said second input component; and
a control system for controlling actuation of said first and second mode clutches.

* * * * *